United States Patent
Lee et al.

(10) Patent No.: US 10,621,165 B2
(45) Date of Patent: Apr. 14, 2020

(54) NEED SUPPORTING MEANS GENERATING APPARATUS AND METHOD

(71) Applicant: AJOU UNIVERSITY INDUSTRY-ACADEMIC COOPERATION FOUNDATION, Suwon-si, Gyeonggi-do (KR)

(72) Inventors: Seok Won Lee, Suwon-si (KR); Dey Sangeeta, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 872 days.

(21) Appl. No.: 15/170,424

(22) Filed: Jun. 1, 2016

(65) Prior Publication Data
US 2017/0277746 A1 Sep. 28, 2017

(30) Foreign Application Priority Data

Mar. 23, 2016 (KR) .................. 10-2016-0034418

(51) Int. Cl.
*G06F 17/00* (2019.01)
*G06F 16/242* (2019.01)
(Continued)

(52) U.S. Cl.
CPC .......... *G06F 16/242* (2019.01); *G06F 16/248* (2019.01); *G06F 16/24575* (2019.01); *G06N 5/04* (2013.01)

(58) Field of Classification Search
None
See application file for complete search history.

(56) References Cited

U.S. PATENT DOCUMENTS

| 9,298,196 B2 * | 3/2016 | Matsuoka .......... G05D 23/1904 |
| 2008/0036577 A1 * | 2/2008 | Natsume .............. B60W 50/14 340/425.5 |

(Continued)

FOREIGN PATENT DOCUMENTS

| KR | 10-2009-0053069 A | 5/2009 |
| KR | 10-2014-0104543 A | 8/2014 |

OTHER PUBLICATIONS

Korean Office Action for corresponding Application No. 10-2016-0034418 dated Jan. 14, 2017.

*Primary Examiner* — Anhtai V Tran
(74) *Attorney, Agent, or Firm* — Sughrue Mion, PLLC

(57) ABSTRACT

The present invention suggests need supporting means generating apparatus and method which extract requirements from a user using a repertory grid which is a cognitive interview technique to generate supporting means thereof. The need supporting means generating apparatus of the present invention includes: a question message generating unit which generates at least one question message related with predetermined context information; an answer message obtaining unit which obtains at least one answer message with respect to the question message; a feature information extracting unit which extracts at least one feature information related with the context information based on the answer message; and a supporting means generating unit which generates at least one supporting means to support needs of a user based on the feature information.

7 Claims, 8 Drawing Sheets

(51) Int. Cl.
   *G06F 16/248*     (2019.01)
   *G06F 16/2457*    (2019.01)
   *G06N 5/04*       (2006.01)

(56) References Cited

U.S. PATENT DOCUMENTS

2010/0146007 A1*  6/2010  Kononov .......... G06F 16/24578
                                                      707/802
2012/0292997 A1* 11/2012  Lee ................. G06Q 50/06
                                                      307/39
2013/0191113 A1   7/2013  In et al.
2016/0026629 A1*  1/2016  Clifford ........... G06F 16/24575
                                                      707/723

* cited by examiner

[FIG. 1]
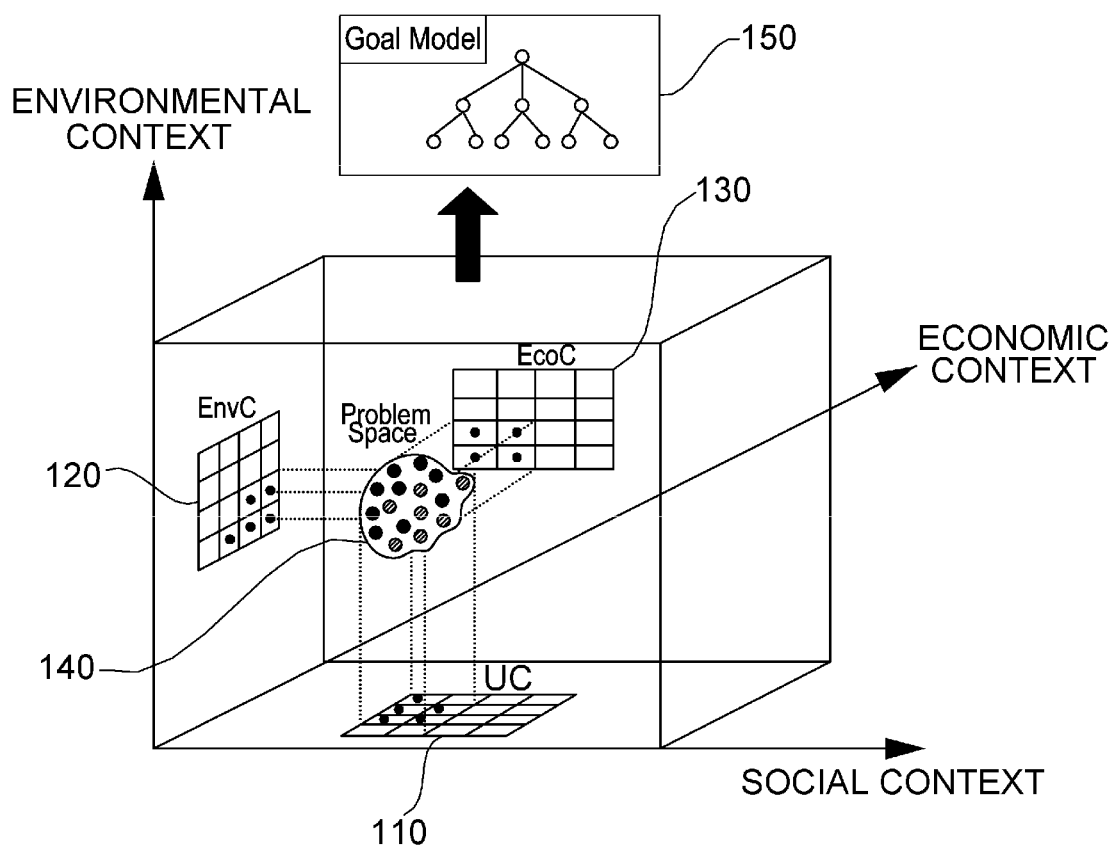

[FIG. 2]
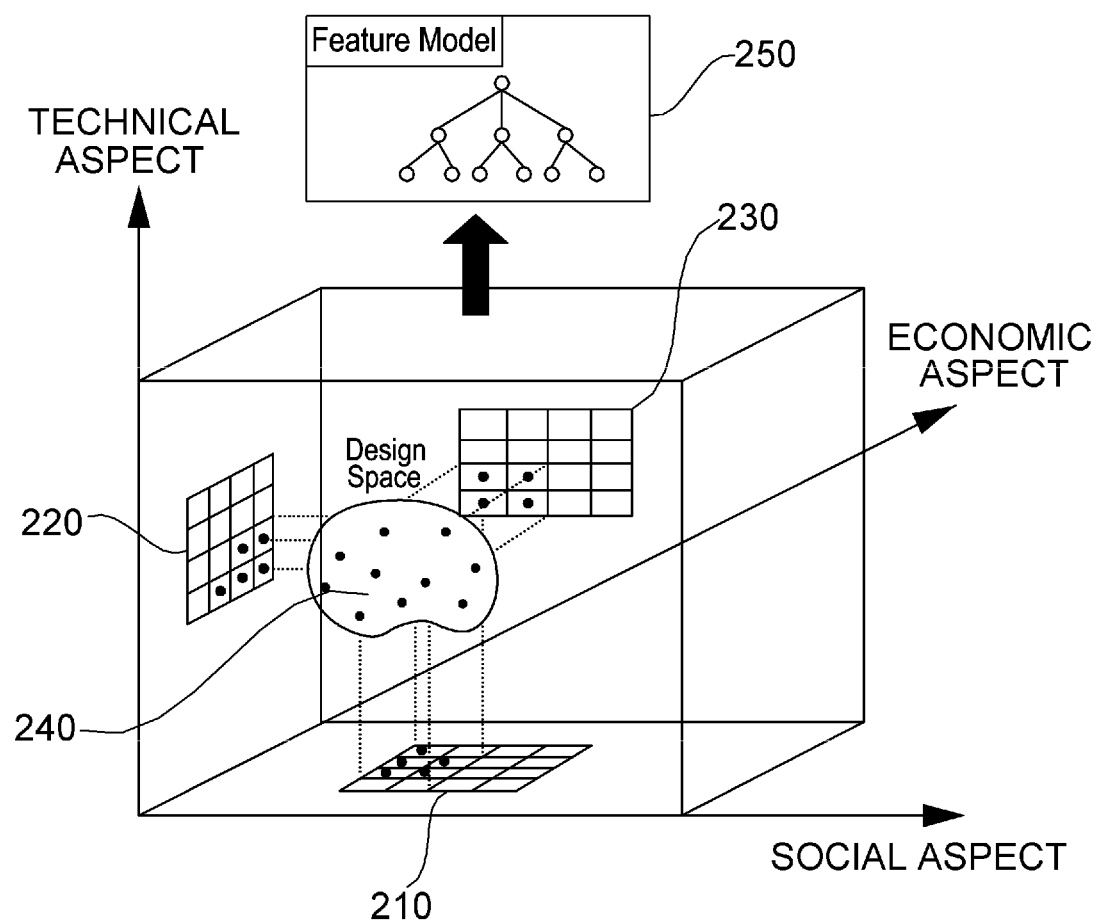

[FIG. 3]
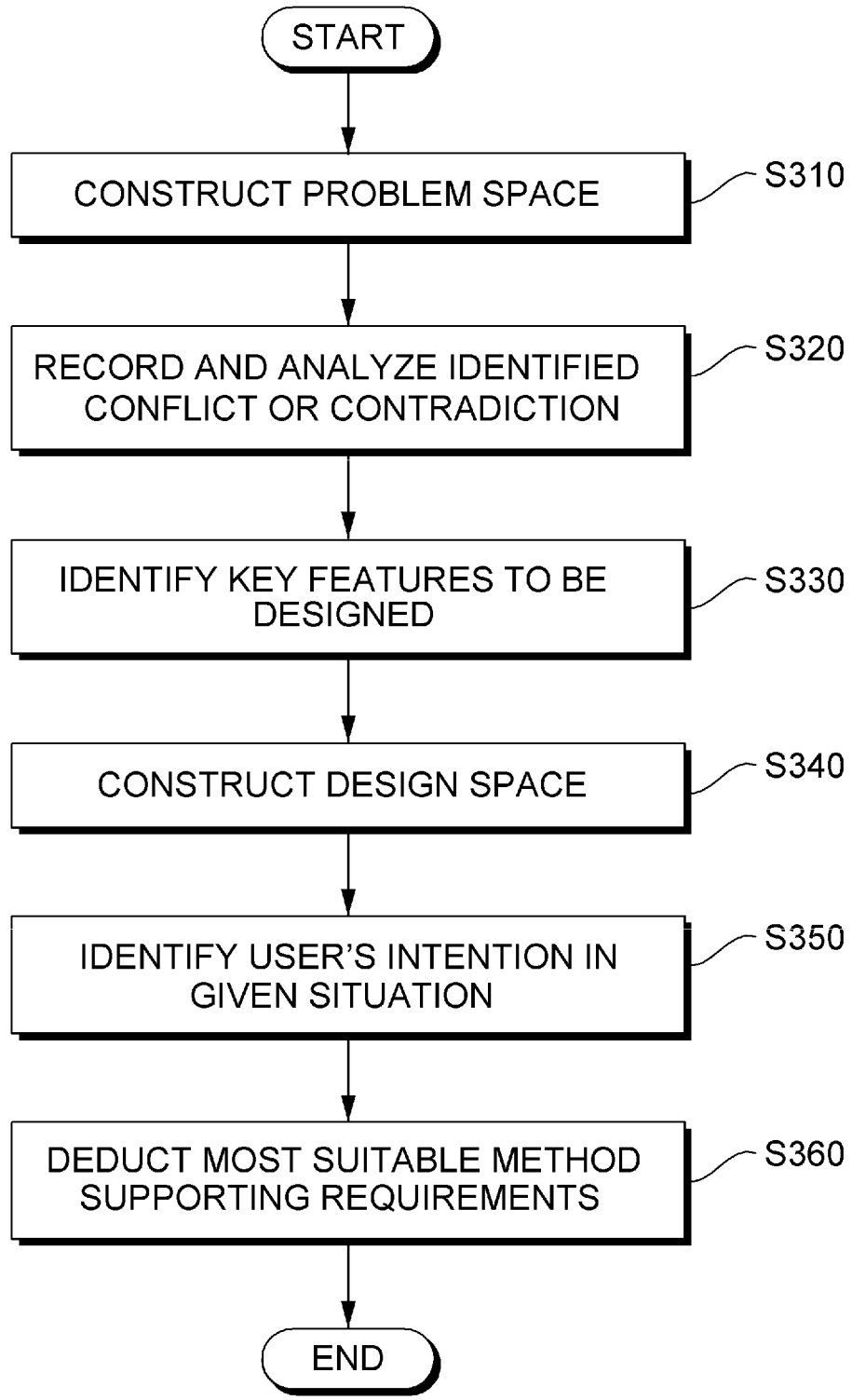

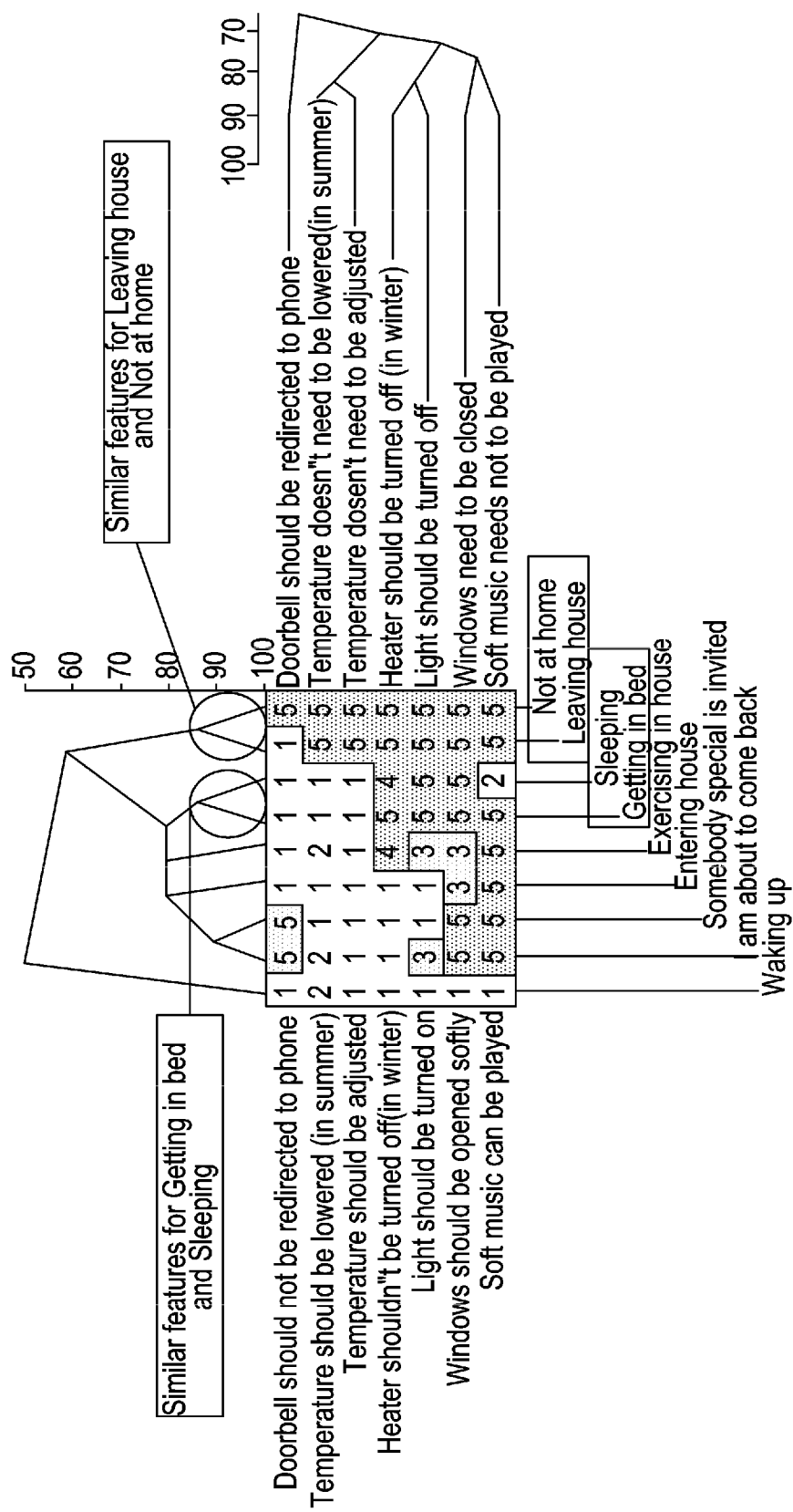
[FIG. 4]

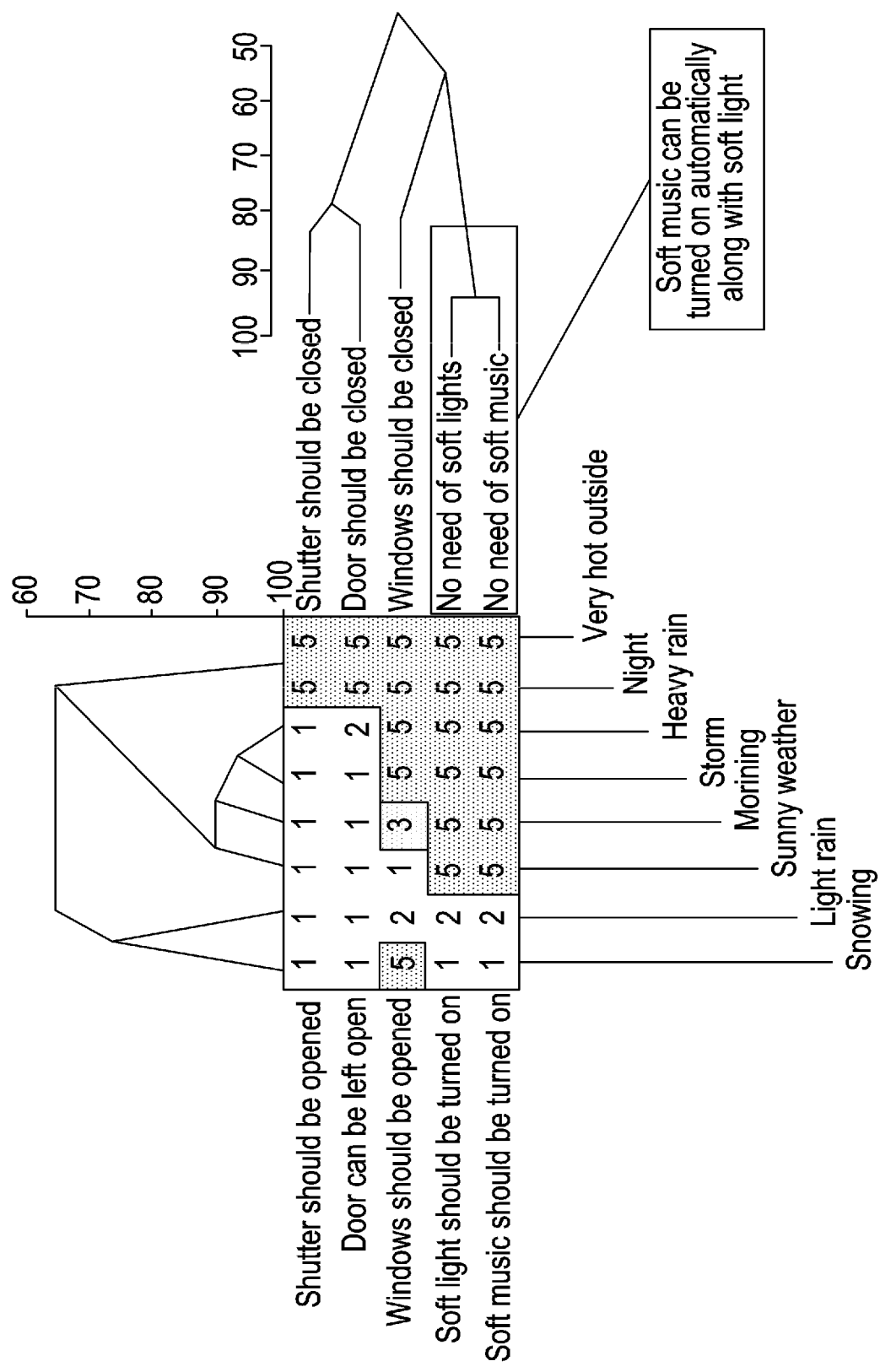
[FIG. 5]

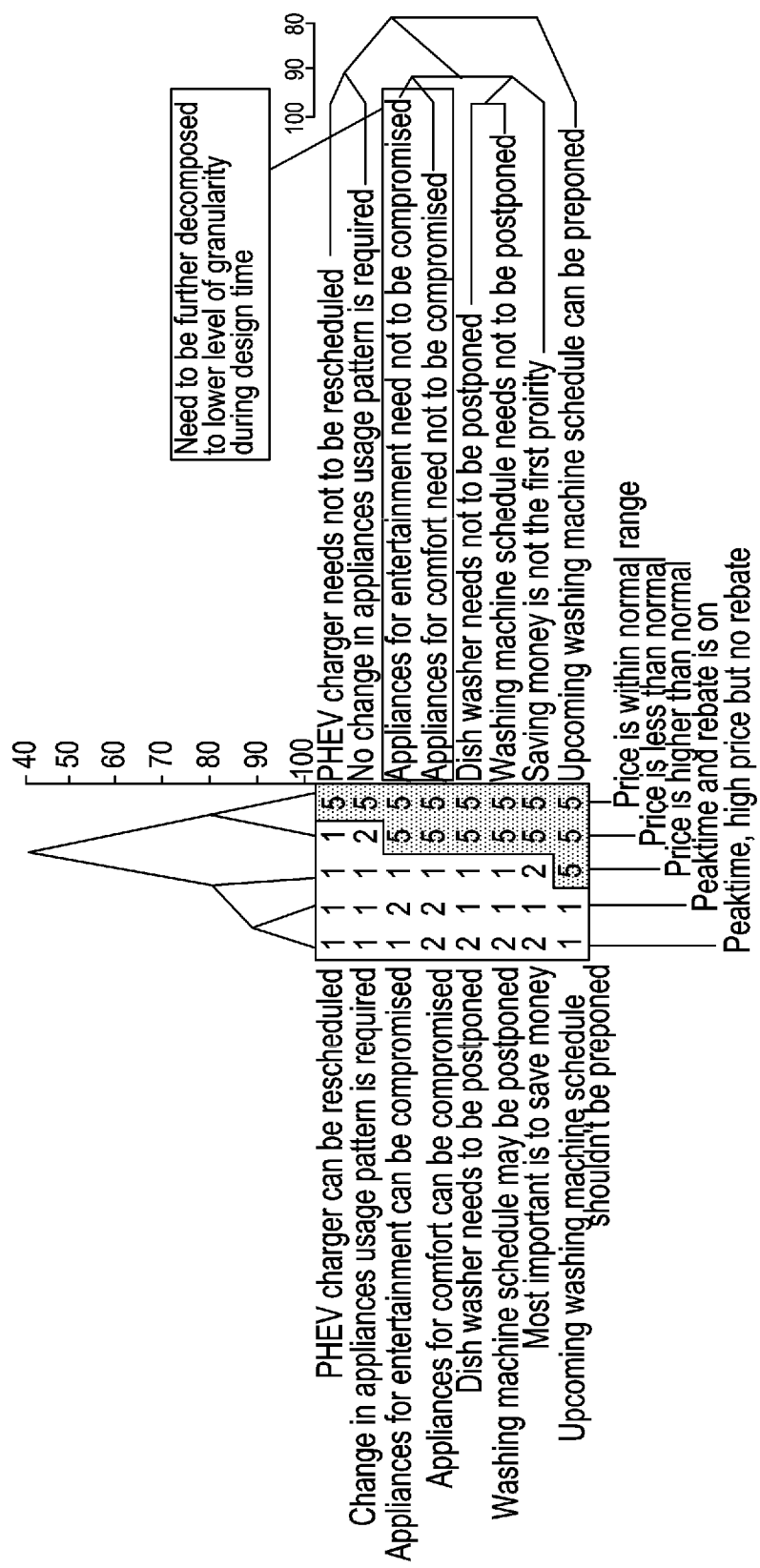
[FIG. 6]

[FIG. 7]
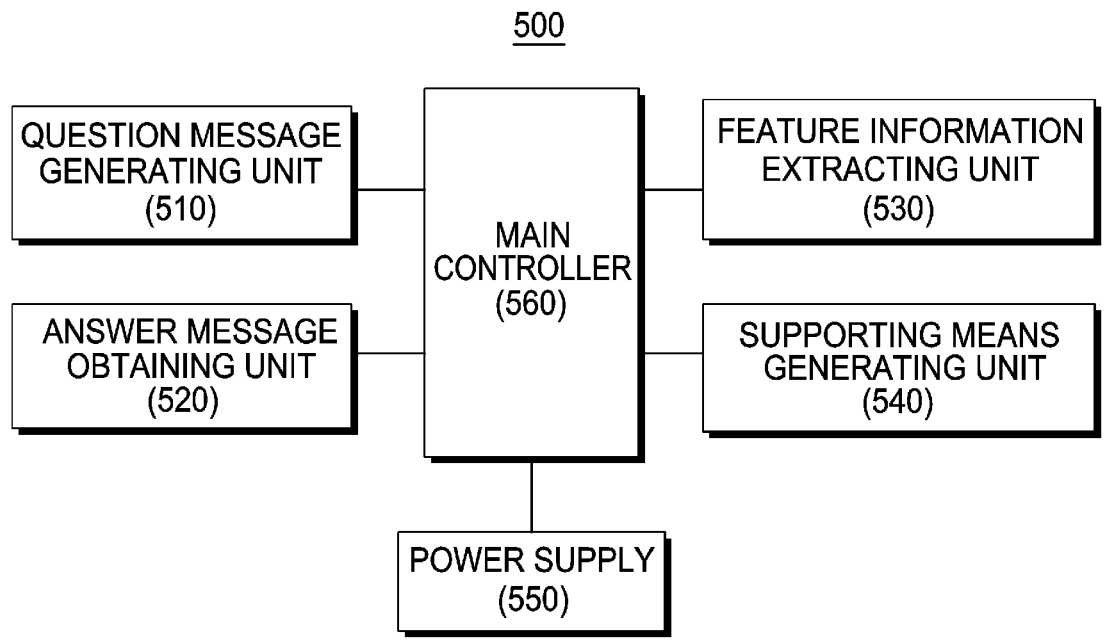
[FIG. 8]
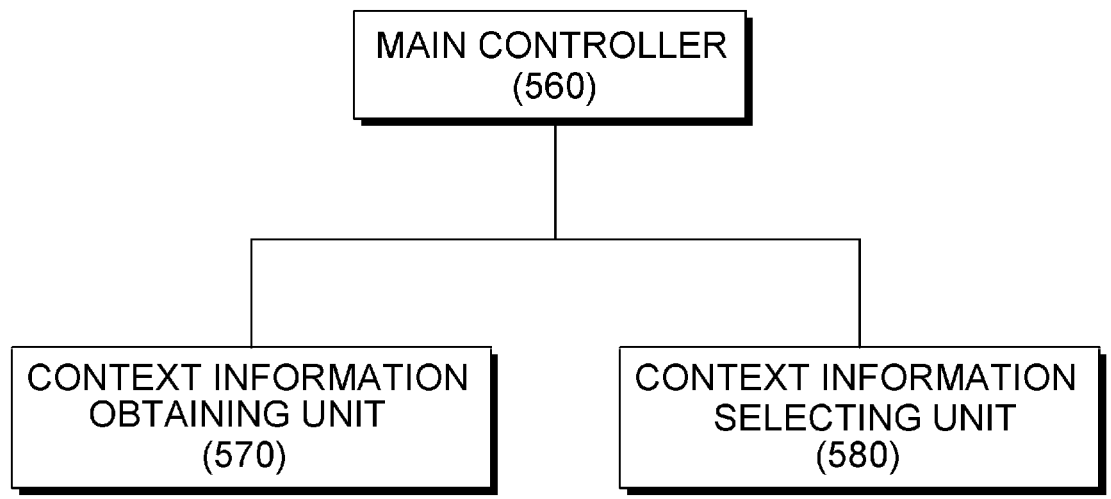

[FIG. 9]
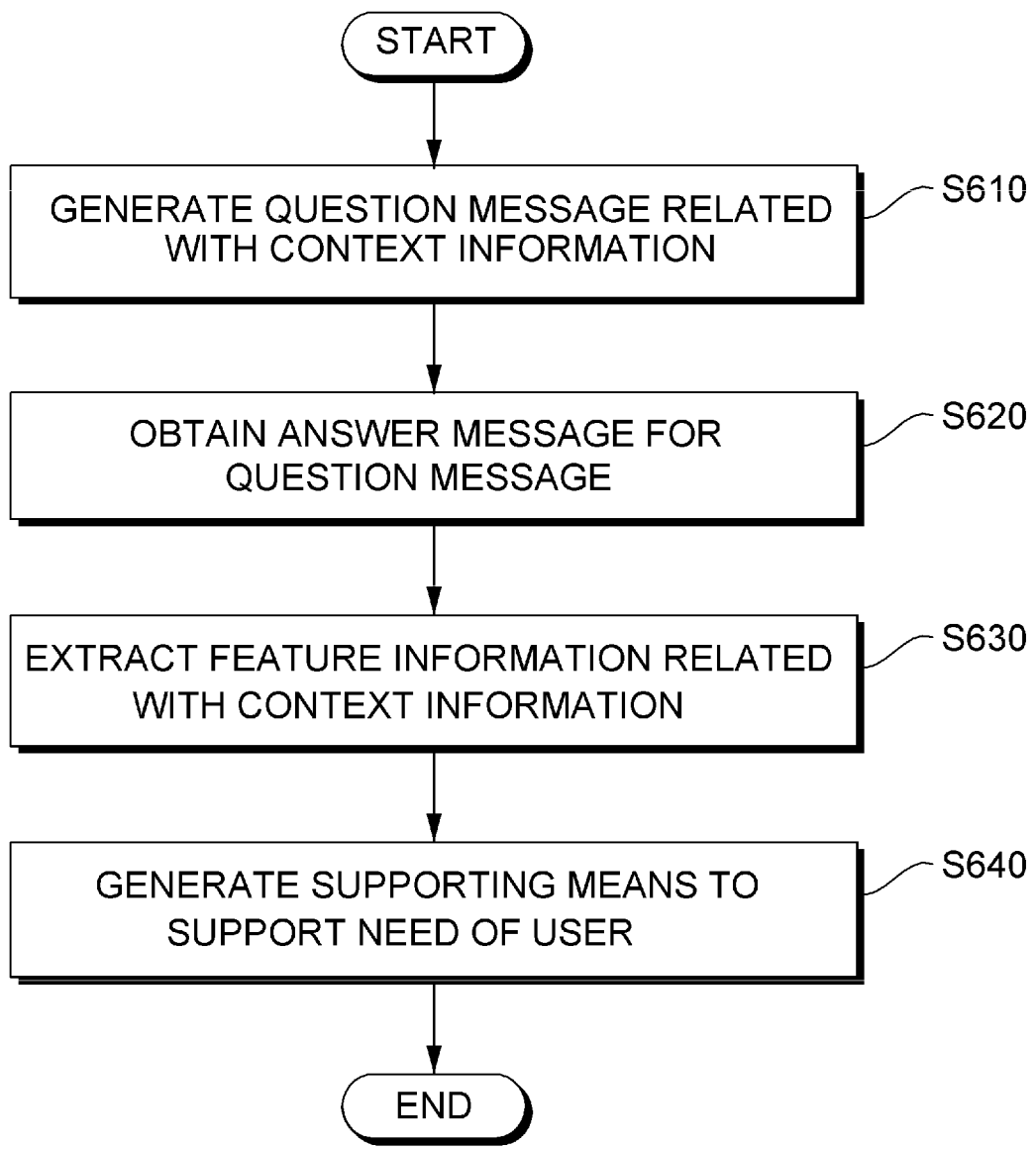

NEED SUPPORTING MEANS GENERATING APPARATUS AND METHOD

CROSS-REFERENCE TO RELATED APPLICATIONS

This application claims priority to and the benefit of Korean Patent Application No. 10-2016-0034418 filed in the Korean Intellectual Property Office on Mar. 23, 2016, the entire contents of which are incorporated herein by reference.

TECHNICAL FIELD

The present invention relates to a methodology that contributes to the field of requirements engineering of self-adaptive systems. In this invention a cognitive interviewing technique Repertory Grid (RG) is used to not only elicit requirements form users but also to perform variability analysis based on the acquired knowledge from users and experts.

BACKGROUND ART

Increasing complexity and dynamics of the execution environment have become a major motivation for designing self-adaptive system. Behavior of the self-adaptive systems is dynamically changed in accordance with various situations of the execution environment. Due to the rapid advancement of technology, self-adaptive systems are now well combined with every aspect of life including comfort, leisure activity, or any personal goal of a user.

Although contributions have been made to the field of formalizing or modeling the requirements of adaptive system, not enough interest has been shown in the requirements elicitation techniques for the same. Extracting requirements of a user considering various contexts and introducing the required flexibility in the system behavior at an earlier stage of a requirement engineering are still well-known challenges. A goal based approach for variability acquisitions has already been studied wherein the variability is discovered from the goals of the interested parties. However, the approach is performed based on a strong presumption that the cognitive ability of the interested party will support the intended complexities of the entire process of variability acquisition. Actually, in many complex fields, it is difficult for the interested parties to represent their requirements by a systematic method.

This motivate us to seek a method for starting requirement engineering activities in more natural way. Selection of a right requirement elicitation technique may be the first step.

SUMMARY OF THE INVENTION

The present invention has been made in an effort to suggest a need supporting means generating apparatus and a method thereof which extract requirements from a user using a repertory grid which is a cognitive interview technique to generate supporting means therefor.

However, an object of the present invention is not limited to the above description and other objects which have not been mentioned above will be more apparent to those skilled in the art from a reading of the following description.

An exemplary embodiment of the present invention provides a need supporting means generating apparatus, including: a question message generating unit which generates at least one question message related with predetermined context information; an answer message obtaining unit which obtains at least one answer message with respect to the question message; a feature information extracting unit which extracts at least one feature information related with the context information based on the answer message; and a supporting means generating unit which generates at least one supporting means to support needs of a user based on the feature information.

The feature information extracting unit may extract the feature information using a repertory grid.

The feature information extracting unit may extract the feature information based on a preference of the user.

The supporting means generating unit may generate means selected from means for supporting smart home or home automation, means for supporting a smart grid, and means for supporting an automatic driving system, as the supporting means.

The apparatus may further include a context information obtaining unit which obtains context information related with the user and the question message generating unit may use the context information related with the user as the predetermined context information.

The context information obtaining unit may obtain first context information related with a state of the user and second context information related with a surrounding environment of a location of the user as context information related with the user.

The context information obtaining unit may further obtain third context information related with a mutual relationship between at least one context information of the first context information and the second context information and the cost as context information related with the user.

The apparatus may further include a context information selecting unit which selects at least one context information among the context information and the question message generating unit may generate the question message related with at least one selected context information.

The context information selecting unit may select at least one context information among the context information based on at least one of relationship information and a priority obtained by comparing different context information.

Another exemplary embodiment of the present invention provides a need supporting means generating method including: generating at least one question message related with predetermined context information; obtaining at least one answer message with respect to the question message; extracting at least one feature information related with the context information based on the answer message; and generating at least one supporting means to support needs of a user based on the feature information.

In the extracting, the feature information may be extracted using a repertory grid.

In the extracting, the feature information may be extracted based on a preference of the user.

In the generating of supporting means, means selected from means for supporting smart home or home automation, means for supporting a smart grid, and means for supporting an automatic driving system may be generated as the supporting means.

Prior to the generating of a question message, the method may further include obtaining context information related with the user. In the generating of a question message, the context information related with the user may be used as predetermined context information.

In the obtaining of context information, first context information related with a state of the user and second context information related with a surrounding environment of a location of the user may be obtained as context information related with the user.

In the obtaining of context information, third context information related with a mutual relationship between at least one context information of the first context information and the second context information and the cost may be further obtained as context information related with the user.

Prior to the generating of a question message, the method may further include selecting at least one context information from the context information. In the generating of a question information, the question message related with at least one selected context information may be generated.

In the selecting, at least one context information may be selected among context information based on at least one of relationship information and a priority obtained by comparing different context information.

According to the present invention, the following effects may be achieved:

First, the requirement of the user may be effectively extracted, thereby providing the optimal supporting means to the user.

Second, it is possible to effectively operate a self-adaptive system.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a conceptual view explaining a problem space.

FIG. 2 is a conceptual view explaining a design space.

FIG. 3 is a flowchart explaining a REASSURE methodology according to the embodiment of the present invention.

FIG. 4 is a referential view illustrating a process of capturing the preference of a user from social contexts using a repertory grid.

FIG. 5 is a referential view illustrating a process of capturing the preference of a user from environmental contexts using a repertory grid.

FIG. 6 is a referential view illustrating a process of capturing the preference of a user from economic contexts using a repertory grid.

FIG. 7 is a block diagram schematically illustrating an internal configuration of a need supporting means generating apparatus according to an exemplary embodiment of the present invention.

FIG. 8 is a block diagram illustrating an internal configuration which may be added to the need supporting means generating apparatus of FIG. 7.

FIG. 9 is a flowchart schematically illustrating a need supporting means generating method according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. In the figures, even though the parts are illustrated in different drawings, it should be understood that like reference numerals refer to the same or equivalent parts of the present invention throughout the several figures of the drawing. Furthermore, when it is judged that specific description of known configurations or functions related to the description of the present invention may unnecessarily obscure the essentials of the present invention, the detailed description will be omitted. Further, hereinafter, exemplary embodiments of the present invention will be described. However, it should be understood that the technical spirit of the invention is not limited to the specific embodiments, but may be changed or modified in various ways by those skilled in the art.

The present invention ultimately relates to a method of designing and operating a self-adaptive system. First, in the exemplary embodiment of the present invention, in order to design and operate the self-adaptive system, a problem space which is defined in view of a user and a design space which is defined in view of a design are distinguished. Further, a repertory grid is used to define features in each space.

The repertory grid is a technique for identifying a personal image or perception information on the surrounding environment to be associated with a matrix response. Such a repertory grid may be applied in a business field such as job analysis, performance measurement, education evaluation, questionnaire plan, or market research.

First, the problem space is defined (defined using a repertory grid) by context and a feature (needs of a user in the corresponding context) required in each context. In this case, as an example, there may be three types of contexts including user's social context, economic conditions, environmental context (weather factors). Further, here, the context may be defined for every specific topic.

Next, the design space is defined (defined using a repertory grid) by multiple design options or design elements and their applicability. However, while designing self-adaptive system design elements need to be analyzed considering not only the technical aspects, but also the social, economic and other aspects. In this case, as an example, the design space may be defined by three types of aspects that influence the design activity—social, technical, economic.

The self-adaptive system may be designed through the following steps, using the problem space and the design space defined using the repertory grid as described above. In this exemplary embodiment of the present invention, a smart home, a smart grid, and an autonomous car may be examples of the self-adaptive system.

According to an exemplary embodiment of the present invention, an operating method of a self-adaptive system includes 1) a step of receiving first set of repertory grid to which a preference of a user for predefined contexts and features defined in advance for each context is input, 2) (a step of setting a priority of the context to determine a priority when features conflict with each other), 3) a step of analyzing the first set of repertory grid to summarize the key features to be designed, 4) a step of receiving second repertory grid in which design elements and points for features defined in advance for each design element are input, 5) a step (of figuring out an intention of the user) of receiving circumstance information of the user, extracting a context suitable for the circumstance information by referring to the first set of repertory grids, and extracting a key feature corresponding to the extracted context among the key features selected in step 3), and 6) a step of selecting a design element to solve the extracted key feature by referring to the second set of repertory grids.

According to the exemplary embodiment of the present invention, it is possible to provide an efficient method which analyzes and uses requirements of a user and knowledge of a designer using a repertory grid. Further, according to the exemplary embodiment of the present invention, it is possible to more efficiently design a complex self-adaptive system in consideration of both viewpoints of the user and the designer by dividing the problem space and the design space.

The present invention described above relates to requirements elicitation (cognitive approach) for adaptive socio-technical systems using a repertory grid (REASSURE). Hereinafter, the exemplary embodiment of the present invention will be described in detail with reference to the drawings.

The main objective of the present invention is to contribute to a field of requirement engineering of a self-adaptive system. In the present invention, not only the requirements are simply extracted from the user by using a cognitive interview technique, repertory grid, but variability is also analyzed from knowledge obtained from the user and an expert.

The self-adaptive behavior is expected to understand user context and user's intention in that context and behave accordingly. A major driving force to design the self-adaptive behavior system needs to be a user, that is, a human.

How to design a solution always depend on how the problem space or the requirements are collected and searched. However, different come with, different viewpoints and different cognitive ability.

The biggest challenging task to perform requirements elicitation is to provide help to get necessary information by an easy method for the user and an analyst. Further, when the problem domain is complex like a social technical system in which social, technical, and economic aspects are mixed with each other, it is more difficult to start the elicitation process by an easy method.

A changing range in the system behavior needs to be discovered by deducting an intentional variability of the user. Further, traceability needs to be provided to any type of design basis which is considered during early and late requirement engineering processes. However, these issues have been overlooked for a long time and modeling and normalization of requirements for SAS have been considered to be more important.

In order to solve the above-mentioned problem, a cognitive approach needs to be performed. Therefore, this job focuses on using a cognitive technology repertory grid in order to obtain knowledge. The collected knowledge is used to construct a multidimensional problem space and the corresponding design space which matches the problem space. Furthermore, individual repertory grids may be preserved through a life cycle of the system. Therefore, since the repertory grid includes the requirements and designs related knowledge, the traceability may be improved.

Conceptualization of Problem Space

FIG. 1 is a conceptual view explaining a problem space.

A first step to design a system is collecting psychological expression of needs of users or a problem space 140. Three main dimensions in which the problem space 140 may be planned include a social context (UC: user's activity/social context) 110, an environmental context (EnvC) 120, and an economic context (EcoC) 130 illustrated in FIG. 1. For example, in the case of a smart home, three following aspects play an essential role to determine requirements and search the problem space.

Social context (UC) 110: whether a user is at home or the user is working at home or is sleeping.

Environmental context (EnvC) 120: whether the weather is clear, rainy, or gloomy.

Economic context (EcoC) 130: price of electricity or electric charge of the user.

In the exemplary embodiment of the present invention, the repertory grid is used to deduct the requirements of the user and influences of the contexts. Combination of intentions of the user clarified from various contexts such as the social context 110, the environmental context 120, and the economic context 130 automatically creates an intentional change in the problem space 140, that is, a goal model 150.

Conceptualization of Design Space

FIG. 2 is a conceptual view explaining a design space.

The design space 240 is a guide line to identify a decision of designers required to solve a given problem, an alternative, and a mutual relationship therebetween. In order to identify design options and applicability thereof, according to the exemplary embodiment of the present invention, not only the technical aspects 220, but also related social aspects 210 and economic aspects 230 need to be considered. In this case, the technical aspects 220 may be considered by technical experts and the economic aspects 230 may be considered by market experts. The social aspects 210 may be considered by the users or experts.

The exemplary embodiment of the present invention suggests generating a feature model 250 in the design space 240 based on the combination of three dimensional spaces 210, 220, and 230 illustrated in FIG. 2, with reference to the above description.

However, the dimensional space selection may vary based on a considered domain. For example, in the case of a smart grid domain, according to the exemplary embodiment of the present invention, needs of the user are identified as the social aspects 210, technical opportunities are identified as the technical aspects 220, and market options and cost techniques are identified as the economic aspects 230.

In the meantime, a current law or political view may be influential in an ambulance sending system or a flood prevention system. The design space 240 may be collected based on the identified dimension using the repertory grid by aid of the knowledge of the experts.

REASSURE Methodology

A REASSURE methodology refers to requirements elicitation for adaptive socio-technical systems using a repertory grid. Hereinafter, six steps of the REASSURE methodology will be described in detail with reference to FIG. 3. FIG. 3 is a flowchart explaining a REASSURE methodology according to the exemplary embodiment of the present invention.

(1) First step: Construct the problem space: Identify various real-world situations and relate them to the features needed in those situations using RG, Concerned Stakeholders: User (S310)

As illustrated in FIGS. 4 to 6, the problem space is constructed by focusing on three types of context such as a social context (UC: user's activity/social context or user context (UC)), an environmental context (EnvC), an economic context (EcoC) (or cost context) using a repertory grid (RG).

FIG. 4 is a referential view illustrating a process of deducting a preference of a user from social contexts using a repertory grid. Referring to FIG. 4, features located at a left side, that is, "Doorbell should not be redirected to phone", . . . , "Soft music can be played" and features located at a right side, that is, "Doorbell should be redirected to phone", . . . , "Soft music needs not to be played" refer to the features required for the social contexts located at a lower side, that is, "Not at home", . . . , "Waking up" etc.

FIG. 5 is a referential view illustrating a process of deducting a preference of a user from environmental contexts using a repertory grid. Referring to FIG. 5, contexts located at a left side, that is, "Shutter should be opened", . . . , or "Soft music should be turned off" and contexts located at a right side, that is, "Shutter should be closed", . . . , or "No need of soft music" refer to the environmental contexts. Further, contexts located at a lower side, that is, "Very hot outside", . . . , or "Snowing" refer to preferences (feature information) of the user deducted using the repertory grid.

FIG. 6 is a referential view illustrating a process of deducting a preference of a user from economic contexts using a repertory grid. Referring to FIG. 6, contexts located at a left side, that is, "PHEV charger can be rescheduled", . . . , "Upcoming washing machine schedule shouldn't be preponed" and contexts located at a right side, that is, "PHEV charger needs not to be rescheduled", . . . , "Upcoming washing machine schedule can be preponed" refer to preferences (feature information) of the user deducted using the repertory grid.

(2) Second step: Record and analyze the identified conflicts or contradictions, Concerned Stakeholders: Requirements Engineer & Designer (S320)

An interview technique may allow objects to describe their needs using natural language, so that the repertory grid analysis may show conflict or contradiction while psychologically interpreting the objects. The conflict may be solved by additional discussion in this step. For example, the object mentions morning, snow, and light rain by different contexts and differently evaluates the morning, snow, and light rain for various features (see FIG. 4). However, needs in a case such as rainy morning or snowy morning are not mentioned.

The object may additionally apply a higher priority to one context which is added than that of other contexts or introduce a new feature to satisfy the expectation.

(3) Third step: Identify the key features needed to be designed from the constructs of the RGs made in Step 1, Concerned Stakeholders: Requirements Engineer & Designer) (S330)

The designer needs to identify key features of a system to be created, based on the preference collected in the problem space. This may be easily achieved by analyzing constructs of the repertory grids. For example, in FIG. 4, the key features may be identified as light management or temperature management.

(4) Fourth step: Construct the design space: Identify various design options and analyze them from multiple aspects (social, technical, economic etc.) using RG, Concerned Stakeholders: Requirements Engineer & Designer) (S340)

After identifying the key features, the designer needs to research all possible methods to support the requirements of the user. For example in a smart home domain, the temperature may be managed by various methods, such as a programmed thermostat, a voice controlled thermostat, a temperature sensor controlled thermostat, or a motion sensor controlled thermostat. All selections may be researched by collecting a metal model of a technical expert using the repertory grid. It is further important to explore the design space at all concerned viewpoints which affect the design decision.

(5) Fifth step: For a given context, identify the user's intentions from the respective columns of the grids in the problem space, Concerned Stakeholders: Requirements Engineer & Designer) (S350)

In any given situation, an activity which needs to be performed first is to decompose the situation into three types of context information. For example, in a situation where "the user needs to work for an additional task at an office even after 9 o'clock and electricity cost is normal, the social context UC is "the user is not at home", the environmental context (EnvC) is "at night", and the economic context (EcoC) is "a price is within a normal range". The designer needs to focus the contexts in the repertory grid into each column.

(6) Sixth step: Select the most suitable features from design space for the concerned context by filtering the design space based on the user's preferences mentioned in the problem space, Concerned Stakeholders: Requirements Engineer & Designer) (S360)

A set of most suitable features needs to be found in a given situation. When the key features requested in the given situation and the user preferences are identified, the designer needs to filter design selections to find the most suitable method which supports the requirements. For example, when there are many methods to manage a temperature in the smart home, the preference and restrictions mentioned by the user are analyzed (that is, through a variability analysis) while constructing the problem space, to find the most suitable method among these.

The exemplary embodiment described above contributes to the requirements engineering field for the self-adaptive system at several points.

First, the exemplary embodiment suggests a creative approach to elicit requirements from the user and analyze design knowledge of the expert using a repertory grid which is a cognitive technique.

Second, the exemplary embodiment explains how to efficiently use the repertory grid by researching the multi-viewpoint problem space and a complex adaptive system design space in a socio-technical environment.

Three, the suggested REASSURE methodology provides a precise guide line to allow the requirement engineer and designer to perform variability analysis of collected knowledge. The repertory grid is considered as a technology which filters design selections based on the intended variability and the user preference in various contexts. The variability analysis is specifically effective in a domain which has not been developed.

The exemplary embodiment of the present invention has been described above with reference to FIGS. 1 to 6. Hereinafter, an exemplary embodiment of the present invention which may be deducted from the exemplary embodiment will be described.

FIG. 7 is a block diagram schematically illustrating an internal configuration of a need supporting means generating apparatus according to an exemplary embodiment of the present invention.

Referring to FIG. 7, a need supporting means generating apparatus 500 includes a question message generating unit 510, an answer message obtaining unit 520, a feature information extracting unit 530, a supporting means generating unit 540, a power supply 550, and a main controller 560.

The power supply 550 supplies a power to individual components which configure the need supporting means generating apparatus 500.

The main controller 560 controls the overall operation of individual components of the need supporting means generating apparatus 500.

The question message generating unit 510 generates at least one question message related with predetermined context information. When the question message is generated by the question message generating unit 510, the main controller 560 may transmit the question message to a user terminal which is carried by the user or display the question message on a display device to be checked with naked eyes of the user. The question message generating unit 510 is a concept which is included in the second step (S320) of the REASSURE methodology.

The answer message obtaining unit 520 obtains at least one answer message for the question message. The answer message obtaining unit 520 obtains an answer message by receiving the answer message from the user terminal or receiving the answer message from the user through a key pad. The answer message obtaining unit 520 is a concept which is included in the second step (S320) of the REASSURE methodology.

The feature information extracting unit 530 extracts at least one feature information related with the context information based on the answer message. The feature information extracting unit 530 is a concept corresponding to the third step (S330) of the REASSURE methodology.

The feature information extracting unit 530 may extract feature information using the repertory grid.

The feature information extracting unit 530 may extract feature information based on a preference of the user. For example, the feature information extracting unit 530 may extract feature information by considering a most frequently repeated keyword among keywords included in the answer message, as a highly preferred keyword.

The supporting means generating unit 540 generates at least one supporting means to support needs of the user based on the feature information extracted by the feature information extracting unit 530. The supporting means generating unit 540 is a concept corresponding to the fourth step (S340) to the sixth step (S360) of the REASSURE methodology.

The supporting means generating unit 540 may generate means selected from means for supporting smart home or home automation, means for supporting a smart grid, and means for supporting an automatic driving system, as the supporting means.

FIG. 8 is a block diagram illustrating an internal configuration which may be added to the need supporting means generating apparatus of FIG. 7.

Referring to FIG. 8, the need supporting means generating apparatus 500 may further include at least one of a context information obtaining unit 570 and a context information selecting unit 580.

The context information obtaining unit 570 obtains context information related with the user. In this case, the question message generating unit 510 may use the context information related with the user as predetermined context information. The context information obtaining unit 570 is a concept corresponding to the first step (S310) of the REASSURE methodology.

The context information obtaining unit 570 obtains first context information related with a state of the user and second context information related with a surrounding environment of a location of the user as context information related with the user.

In the above description, the first context information includes, for example, whether the user is at home or whether the user works at home. The second context information includes, for example, whether the weather is clear or rainy or whether the temperature is low or high.

The context information obtaining unit 570 may further obtain third context information related with a mutual relationship between at least one context information of the first context information and the second context information and the cost as context information related with the user.

In the above description, the third context information includes, for example, an electric charge, a heating bill, or an electric charge for air conditioner of the user. The electric charge is an example when the third context information is context information related with the mutual relationship between the first context information and the cost. The heating bill is an example when the third context information is context information related with the mutual relationship between the second context information and the cost. The electric charge for air conditioner is an example when the third context information is context information related with the mutual relationship among the first context information, the second context information, and the cost.

The context information selecting unit 580 selects at least one context information among context information obtained by the context information obtaining unit 570. In this case, the question message generating unit 510 may generate a question message related with at least one selected context information. The context information selecting unit 580 is a concept which is included in the second step (S320) of the REASSURE methodology.

The context information selecting unit 580 may select one context information among context information based on at least one of relationship information and a priority obtained by comparing different context information.

When the context information is selected only based on the priority, the context information selecting unit 580 may select the context information in accordance with the following order.

First, the context information selecting unit 580 aligns the context information based on the priority. Next, the context information selecting unit 580 determines the number to be selected. Next, the context information selecting unit 580 selects the context information as many as the corresponding number, from context information having a highest priority.

When the context information is selected only based on the relation information, the context information selecting unit 580 may select the context information in accordance with the following order.

First, the context information selecting unit 580 compares different context information to create context information having similar concepts as one group (grouping). For example, when the context information is morning, snow, or rain, the context information selecting unit 580 determines that snow and rain are context information having similar concepts related with the weather and creates snow and rain as one group. Next, the context information selecting unit 580 selects context information included in a specific group. When there is a plurality of context information included in the specific group, the context information selecting unit 580 may select at least one context information therefrom.

When the context information is selected based on both the priority and the relationship information, the context information selecting unit 580 may select the context information in accordance with the following order.

First, the context information selecting unit 580 compares different context information to create context information having similar concepts as one group. Next, the context information selecting unit 580 detects context information included in a specific group. Next, the context information selecting unit 580 aligns the detected context information in accordance with the priority. Next, the context information selecting unit 580 determines the number to be selected. Next, the context information selecting unit 580 selects the context information as many as the corresponding number, from context information having a highest priority.

The above-described selecting method is an example when the relationship information between the priority and the relationship information is considered preferentially to the priority. However, the present invention is not limited thereto, and the priority may be considered preferentially to the relationship information. In this case, the context information selecting unit 580 may select the context information in accordance with the following order.

First, the context information selecting unit 580 aligns the context information in accordance with the priority. Next, the context information selecting unit 580 compares different context information to create context information having similar concepts as one group. In this case, the context information selecting unit 580 creates context information having similar concepts as one group while maintaining the order of the context information which is aligned in accordance with the priority. Next, the context information selecting unit 580 selects a specific group. Next, the context information selecting unit 580 determines the number to be selected. Next, the context information selecting unit 580 selects context information corresponding to the number from the context information included in the specific group.

Next, an operating method of the need supporting means generating apparatus 500 will be described. FIG. 9 is a flowchart schematically illustrating a need supporting means generating method according to an exemplary embodiment of the present invention.

First, a question message generating unit 510 generate at least one question message related with predetermined context information in step S610.

Next, an answer message obtaining unit 520 obtains at least one answer message for the question message in step S620.

Next, a feature information extracting unit 530 extracts at least one feature information related with the context information based on the answer message in step S630.

Next, the supporting means generating unit 540 generates at least one supporting means to support needs of the user based on the feature information in step S640.

In the meantime, the context information obtaining unit 570 may obtain context information related with the user prior to step S610, in step A. By doing this, the question message generating unit 510 may use the context information related with the user as predetermined context information in step S610.

In the meantime, the context information selecting unit 580 may select at least one context information among context information prior to step S610 in step B. By doing this, the question message generating unit 510 may generate a question message related with at least one context information selected in step S610. Step B may be performed between step A and step S610.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A need supporting means generating apparatus including at least one processor and a non-transitory computer-readable medium storing instructions that, when executed by the at least one processor, cause the apparatus to:
    obtain (i) a first repertory grid including context information related with a preference of a user and (ii) a second repertory grid including design elements, the context information including information of different types of contexts;
    set a priority of the different types of contexts;
    generate at least one question message related with the context information;

obtain at least one answer message with respect to the question message;

extract at least one feature information related with the context information from the first repertory grid considering the preference of the user and the priority of the different types of contexts based on the answer message; and generate at least one supporting means to support needs of the user by referring to the second repertory grid based on the extracted feature information, wherein the instructions, when executed by the at least one processor, cause the apparatus to generate means selected from means for supporting smart home or home automation, means for supporting a smart grid, and means for supporting an automatic driving system, as the supporting means, wherein the instructions, when executed by the at least one processor, cause the apparatus to:

obtain a plurality of pieces of context information related to the user;

determine a number of pieces of context information having similar concepts among the plurality of pieces of context information, create the number of pieces of context information having the similar concept as a group of context information, and select at least one context information from the group.

2. The apparatus of claim 1, wherein the instructions, when executed by the at least one processor, cause the apparatus to obtain first context information related with a state of the user using the first repertory grid and second context information related with a surrounding environment of a location of the user as context information related with the user using the first repertory grid.

3. The apparatus of claim 2, wherein the instructions, when executed by the at least one processor, cause the apparatus to obtain third context information related with a mutual relationship between at least one context information of the first context information and the second context information and the cost as context information related with the user using the first repertory grid.

4. The apparatus of claim 1,
wherein the instructions, when executed by the at least one processor, further cause the apparatus to:
select at least one context information among the context information, and
generate the question message related with the at least one selected context information.

5. The apparatus of claim 4, wherein the instructions, when executed by the at least one processor, cause the apparatus to select at least one context information among the context information based on relationship information.

6. A need supporting means generating method implemented by a need supporting means generating apparatus including a processor and a non-transitory computer-readable medium storing instructions, the method comprising:

obtaining (i) a first repertory grid including context information related with a preference of a user and (ii) a second repertory grid including design elements, the context information including information of different types of contexts;

setting a priority of the different types of contexts;

generating at least one question message related with the context information;

obtaining at least one answer message with respect to the question message;

extracting at least one feature information related with the context information from the first repertory grid considering the preference of the user and the priority of the different types of contexts based on the answer message; and generating at least one supporting means to support needs of the user by referring to the second repertory grid based on the extracted feature information, wherein in the generating of supporting means, means selected from means for supporting smart home or home automation, means for supporting a smart grid, and means for supporting an automatic driving system is generated as the supporting means, wherein the method further comprises:

obtaining a plurality of pieces of context information related to the user, determining a number of pieces of context information having similar concepts among the plurality of pieces of context information, creating the number of pieces of context information having the similar concepts as a group of context information, and selecting at least one context information from the group.

7. The method of claim 6, further comprising:

selecting at least one context information among the context information, wherein in the generating of at least one question message, the question message related with at least one selected context is generated.

* * * * *